United States Patent

[11] 3,542,054

[72] Inventor  Madden T. Works
              Houston, Texas
[21] Appl. No. 719,643
[22] Filed     April 8, 1968
[45] Patented  Nov. 24, 1970
[73] Assignee  ACF Industries Incorporated
               New York, New York
               a corporation of New Jersey

[54] LUBRICATED DOUBLE-ACTING VALVE SEAT
     11 Claims, 6 Drawing Figs.
[52] U.S. Cl. .................................................. 137/246.22,
                                              251/172, 251/315
[51] Int. Cl. ................................................... F16k 5/22
[50] Field of Search .......................................... 137/246.22,
                         246.12, 246.11, 246; 251/172, 315

[56]              References Cited
              UNITED STATES PATENTS
2,796,230   6/1957  Grove ........................... 251/172

3,378,026   4/1968  Oliver ........................... 137/246.22
3,416,558  12/1968  Works ........................... 137/246.22
3,421,733   1/1969  Stewart ......................... 251/172

Primary Examiner—Clarence R. Gordon
Attorney—James L. Jackson

ABSTRACT: A valve having movable seat members disposed within seat recesses on either side of a movable valve member. The seat assemblies of this invention include movable back seal carrier members disposed in annular chambers which maintain multiple seals between the valve body and seat assemblies and define lubricant communication between lubricant passages formed in the valve body and lubricant passages formed in the seat assembly. The back seal carrier is movable responsive to fluid pressure from the flow passage of the valve or from the valve body and responsive to lubricant pressure to achieve pressure actuation of both the upstream and downstream seat assemblies in a direction toward the valve member.

Patented Nov. 24, 1970
3,542,054
Sheet 1 of 2
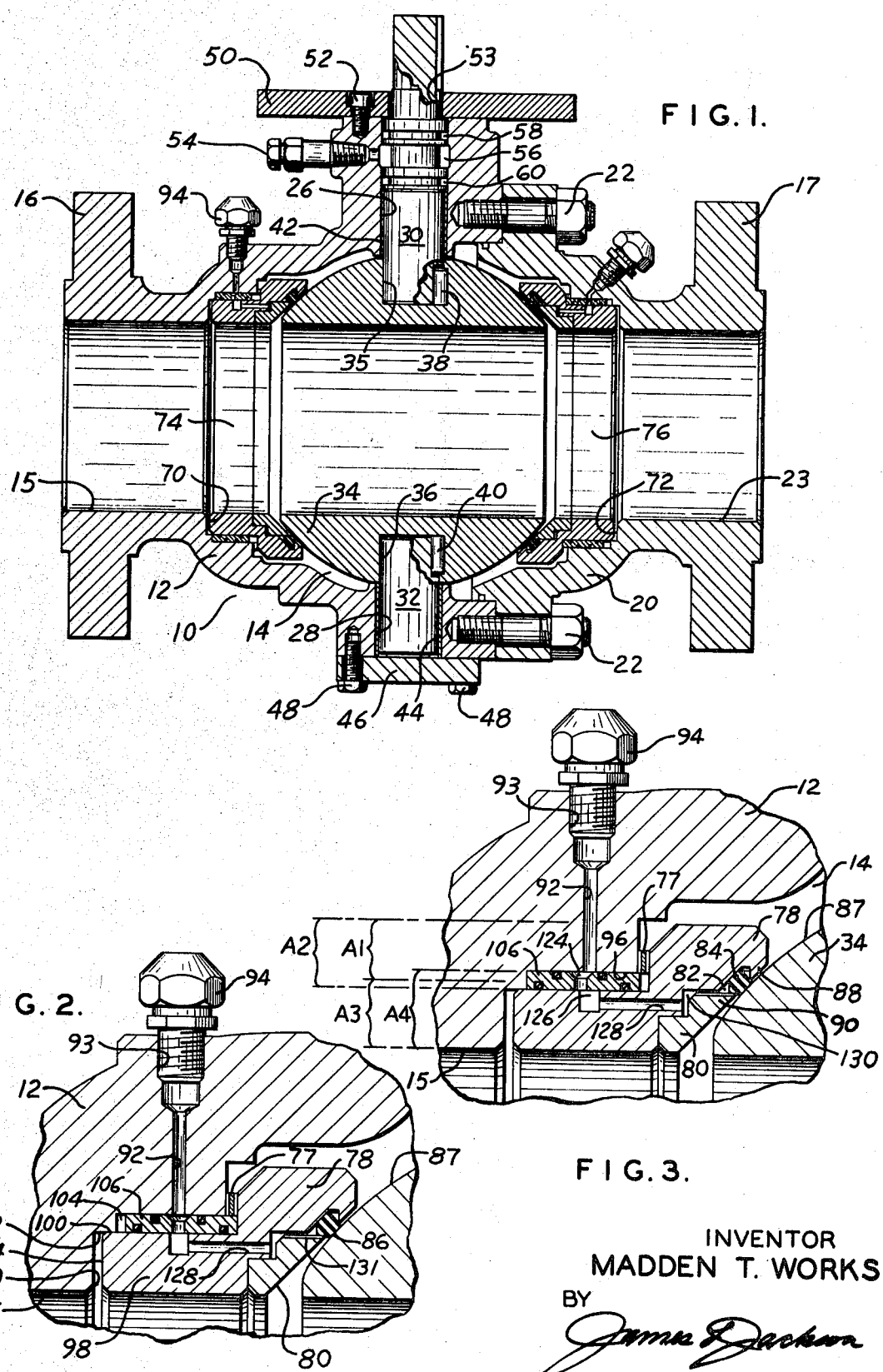
FIG. 1.
FIG. 2.
FIG. 3.
INVENTOR
MADDEN T. WORKS
BY
AGENT

*INVENTOR.*
MADDEN T. WORKS
BY
*James Jackson*
AGENT

LUBRICATED DOUBLE-ACTING VALVE SEAT

FIELD OF THE INVENTION

This invention relates generally to valves and more specifically to valves having means for the introduction of lubricant material from the exterior of the valve to a working surface of a valve member to achieve proper lubrication between the valve member and seat assemblies and to assure positive sealing therebetween. The invention is particularly directed to pressure actuatable seat assemblies which utilize the forces of fluid pressure within the valve body and the flow passages to bias the upstream and downstream assemblies into positive sealing engagement with the valve member.

Valve lubricant and sealant systems are quite well known and are commercially available in many of the numerous types of valves presently manufactured. Lubrication systems for valves having movable valve seats generally include a pair of spaced sealing members which are interposed between the seat assembly and the valve body to maintain a fluid-tight seal on either side of a lubricant passage which extends from the exterior of the valve body to the seat recess. The seat assembly of a lubricated valve is generally provided with a lubricant passage which opens into the seat recess between the sealing members and serves to transport lubricant material to the working surface of the valve member to achieve proper lubrication and to enhance the sealing ability of the valve. Although lubrication systems of this nature are quite well known in the art, it has not been considered practical in the past to provide seat constructions which not only include a lubrication and sealant system but also provide for both upstream and downstream pressure actuation of the seat assemblies.

A further problem of major importance concerns the ability of a sealant or lubricating system of a valve to assure complete and even distribution of the lubricant material about the working surface of the valve member. This problem has been quite readily overcome in the past by the employment of spaced sealing members which are disposed on either side of the lubricant injection passage to define an annular lubricant channel about the exterior peripheral surface of the seat assembly in the manner set forth above. A plurality of lubricant passages are generally formed in the seat assembly for even distribution of the lubricant. To employ lubrication distribution features of this nature in seat assemblies subject to both upstream and downstream pressure actuation, however, has not heretofore been considered practical.

Accordingly, it is a primary object of the instant invention to provide a novel valve construction having lubricated and pressure-actuated seat assembly structure which effectively accomplishes simultaneous upstream and downstream seals with the working surface of the valve member and promotes even distribution of the sealant material on the working surface of the valve member.

It is a further object of this invention to provide a novel lubrication system for a valve construction wherein fluid communication is maintained at all times between the seat assembly passages and the lubricant injection passages regardless of the direction of fluid flow through the valve and regardless of the state of pressure actuation of the seat assemblies.

Among the objects of this invention is contemplated the provision of a novel valve construction having a lubricated and pressure-seat assembly and which construction is simple in manufacture, reliable in use and low in cost. Other and further objects of this invention will become obvious upon an understanding of the illustrative embodiments about to be described or will be indicated in the appended claims, and various advantages not referred to herein will occur to one skilled in the art upon employment of the invention in practice.

A preferred embodiment of the invention has been chosen for purpose of illustration and description and is shown in the accompanying drawings forming a part of the specification wherein:

FIG. 1 is an elevational view in section illustrating a spherical plug valve constructed in accordance with the spirit and scope of this invention.

FIG. 2 is a fragmentary sectional view of the valve of FIG. 1 illustrating the seat lubrication system of the valve in detail.

FIG. 3 is a fragmentary sectional view of the valve of FIG. 1 illustrating the position of the parts of the seat assembly under opposite pressure actuation as compared to FIG. 2.

Figure 4:
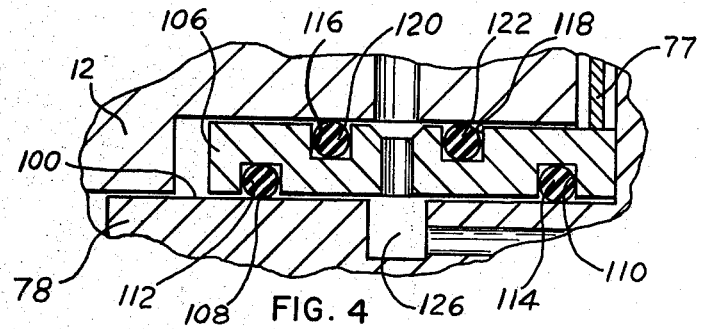
FIG. 4 is a fragmentary sectional view of the bearing and seal carrier structure of FIGS. 1, 2 and 3 illustrating the seal carrier and the O-ring seals in detail.

Referring now to the drawings for a more complete understanding of the invention, a valve which may be an end entry spherical plug valve as illustrated at 10 in FIG. 1 has a valve body portion 12 thereof defining a valve chamber 14. The valve body portion 12 of the valve 10 is formed with an inlet or outlet flow passage 15 in fluid communication with the valve chamber 14. The valve body may be provided with a flange structure shown at 16 in FIG. 1, or it may be provided with a weld end construction for either bolted or welded connection of the valve 10 to a pipeline or other conduit structure. Other conventional methods of connection between the valve 10 and a pipeline such as threaded connection, for example, may be employed without departing from the spirit or scope of this invention. An end closure portion 20 of the valve 10 is retained in sealed assembly with the valve body portion 12 by a series of bolts or threaded studs 22 and defines a closure for the valve chamber. The end closure member 20 is formed with an inlet or outlet flow passage 23 which is disposed in axial alignment with the flow passage 15. The end closure member 20 may be provided with a flanged structure 17 for bolted connection thereof to a pipeline or other suitable conventional connection structure may be employed within the spirit or scope of this invention.

The valve body 12 is formed with upper and lower aligned apertures 26 and 28, respectively, which receive upper and lower trunnion members 30 and 32 respectively therein. A valve member 34 which may be a spherical plug is provided with upper and lower trunnion apertures 35 and 36, respectively, which receive the upper and lower trunnions 30 and 32 to maintain alignment of the spherical plug within the valve body. Upper and lower key members 38 and 40 are retained within interrelated slot structures formed within the plug members and trunnion members to provide nonrotatable connection between the trunnion and the spherical plug. If desired, the key structure for the lower trunnion 32 may be eliminated and the spherical plug 34 may be disposed in rotatable relation to the lower trunnion. It is required only that there be a nonrotatable connection between the operating trunnion or stem 30 and the spherical plug 34 for purpose of valve operation. Bearing sleeve members 42 and 44 are interposed between the trunnion members and the respective cylindrical trunnion bores in the valve body. A cover plate 46 which provides a closure and support plate for the trunnion aperture 28 is fixed to the valve body 12 by a series of bolts 48. An operator adapter plate 50 is connected by a series of cap screws 52 to the upper extremity of the valve body about the upper trunnion bore 26. The upper trunnion or stem 30 extends through an aperture 53 formed in the adapter plate. Any of a number of commercially available power or manually-actuated valve operator devices may be fixed to the adapter plate 50 in any desirable manner to provide mechanical means for imparting rotation to the upper trunnion member 30, and thereby to impart rotation to the spherical plug member between the open and closed positions thereof.

For establishing a seal between the upper trunnion or stem 30 and the valve body 12, a stem-packing adapter 54 is connected to the valve body 12 by threading or the like. The packing adapter is utilized to force semisolid packing material into an annular packing chamber 56 defined about the valve stem 30. A pair of sealing members 58 and 60 are disposed on opposite sides of the packing chamber 56 within annular grooves formed in the stem 30 and serve to prevent escape of the packing material from the packing chamber through the stem aperture 26.

To establish a seal between the rotatable spherical plug member 34 and the valve body, a pair of annular seat assemblies 74 and 76 are retained respectively within annular seat pockets 70 and 72 formed about the flow passages 15 and 23 as illustrated in detail in FIGS. 2 and 3.

As illustrated in detail in FIGS. 2 and 3 and forming an important part of this invention, the valve body 12 of the valve 10 is formed with a pair of seat recesses or seat pockets 70 and 72, each having a seat assembly structure 74 and 76 positioned respectively therein. The seat assemblies are biased toward the spherical plug 34 by a spring member 77 which is illustrated in FIG. 2 as a wave spring, but which may be any of various types of commercially available spring devices. As illustrated in the drawings, each of the seat assemblies 74 and 76 comprises a seat ring 78 and a retainer ring 80 which interfit in such manner as to define an annular groove 82 having a generally triangular cross-sectional shape. A face sealing member 84 is disposed within the annular groove with an annular sealing portion 86 thereof extending through a restricted annular opening defined by cooperating lips 88 and 90 formed on the seat ring 78 and the retainer ring 80 respectively. An annular sealing portion 86 of the annular resilient face sealing member 84 contacts the working surface 87 of the spherical plug member 34 and establishes an annular perimeter of sealing contact therewith.

To provide for proper lubrication between the seat assemblies and the spherical working surface 87 of the plug member 34 and to enhance the sealing ability of the valve, the valve body 12 and the end member 20 are each provided with lubricant passage structure for conducting lubricant material to the seat assemblies. As illustrated in FIGS. 2 and 3, a lubricant passage 92 is formed in the valve body 12 and is provided with internal threads 93 at the outer extremity thereof for threadedly receiving the threaded portion of a lubricant injection member 94. The lubricant passage 92 opens into an enlarged diameter portion of the seat recess 70 defined by a generally cylindrical wall 96. The seat ring 78 is provided with an elongated generally cylindrical portion 98 having a substantially cylindrical exterior peripheral surface 100 which surface is received within a smaller diameter portion of the seat recess 70 define defined by a substantially cylindrical surface 102. The cylindrical peripheral surface 100 of the cylindrical portion 98 of the seat ring is disposed in substantially concentric-spaced relation with the cylindrical wall 96 of the seat recess, thereby defining an annular chamber 104 about the cylindrical portion 98 of the seat ring.

An annular seal carrier and bearing member 106 is disposed within the annular chamber 104 in sliding engagement with the substantially cylindrical surfaces 100 and 96 of the seat ring and seat recess respectively and serves to provide bearing and sealing engagement with both of the adjacent surfaces 100 and 96. The seal carrier member 106 is provided with a pair of interior seal grooves 108 and 110 disposed adjacent the extremities and formed in the inner periphery of the carrier member. Annular sealing members 112 and 114 are disposed respectively in the grooves 108 and 110 and serve to establish sealing engagement between the bearing and carrier member 106 and the peripheral surface 100 of the seat ring. The carrier member 106 is also provided with a pair of exterior grooves 116 and 118 formed in the outer periphery of the carrier which receive annular sealing members 120 and 122 respectively for the establishment of sealing engagement between the carrier member and the cylindrical surface 96 of the seat recess 70. The annular chamber 104 is of greater length than the axial length of the seat carrier member 106, thereby allowing the bearing and seal carrier to be capable of shifting either upstream or downstream in response to the application fluid pressure there against. For example, FIG. 2 illustrates the seal carrier 106 as being pressure actuated to the right by fluid pressure acting from the flow passages of the valve while FIG. 3 illustrates the seal carrier as being pressure actuated to the left in response to body pressure. The inner and outer peripheral surfaces of the seal carrier 106 also provide bearing contact of substantial axial length with the seat ring 78 and with the cylindrical wall 96 respectively to maintain accurate alignment of the seat assembly within the seat recess. This feature insures the maintenance of a positive seal between the sealing member 84 and the working surface 87 of the plug.

The bearing and seal carrier 106 is provided with a lubricant port 124 which is disposed in fluid communication with the lubricant passage 92 as shown in FIGS. 2 and 3. The lubricant port 124 conducts lubricant material from the lubricant passage 92 to a circumferential lubricant groove 126 formed in the cylindrical portion 98 of the seat ring 78. A plurality of lubricant passages 128 are formed in the seat ring 78 and communicate the circumferential groove 126 with an annular internal distribution chamber 130, which cooperates with the passages 128 to evenly distribute the lubricant material so that the lubricant material may flow evenly through a restricted clearance defined between the exterior periphery of the retainer member 80 and a cylindrical surface which is disposed in spaced juxtaposition relative thereto. To provide for an even distribution of the lubricant material on the working surface 87 of the spherical plug member, the exterior peripheral surface of the retainer ring 80 is provided with parallel knurling 131 which cooperates with the interior periphery of the sealing member 84 to define a plurality of very small lubricant passages having their outlet openings immediately adjacent the contact area between the annular portion 86 of the sealing member 84 and the working surface 87 of the plug member 34. Because of this construction lubricant material is deposited precisely at the area where it is needed to aid the sealing member 84 in the establishment of a positive seal.

With reference now to FIG. 3, the areas of the seat assembly structure upon which fluid pressure acts is represented by reference characters A1, A2, A3 and A4. Area A1 includes that portion of the seat assembly at the front or face portion thereof which extends outwardly of the perimeter of sealing contact between the sealing member 84 and the working surface 87 of the plug member 34 and is exposed to fluid pressure from the valve chamber 14. Area A2 represents the area at the rear of the seat assembly which is in communication with fluid pressure from the valve chamber 14. It is clear clear from an inspection of FIG. 3 of the drawings that area A2 is greater than area A1. Fluid pressure of any given magnitude within the valve chamber 14 acting simultaneously against areas A1 and A2 will produce a greater resulting force against the area A2 than the force developed against area A1. The resultant force produced on the surfaces A1 and A2 will apply a bias on the seat assembly forcing it to move and be retained in engagement with the plug member 34.

Area A3 represents an area at the face or front portion of the seat assembly which is located inwardly of the perimeter of sealing contact between the sealing member 84 and the working surface 87 of the plug and which is in fluid communication with pressurized fluid within the flow passage 15. Area A4 represents the area at the rear portion of the seat assembly which is in fluid communication with fluid pressure from the flow passage 15. From inspection of areas A3 and A4, it is obvious that area A4 is greater. Since these two areas of the seat will be acted upon by fluid at the same pressure, it is obvious that a resultant force will be produced which is greater at the rear portion of the seat assembly than at the face portion thereof thereby resulting in the application of a resultant bias on the seat assembly to maintain the seat in sealing engagement with the working surface of the plug member. Areas A1 and A2 of the downstream seat assembly and areas A3 and A4 of the upstream seat assembly cooperate to maintain both the upstream and the downstream seat assemblies biased into fluid-tight sealing engagement with the working surface of the plug member. This feature is referred to as pressure actuation of the seat assemblies. Assuming that the seat assembly of FIG. 3 is functioning as a downstream seat in the manner illustrated and assuming the spherical plug 34 to be rotated 90° to its closed position, the fluid pressure within the valve chamber 14 would be higher than the fluid pressure within the downstream flow passage 15 of the valve. Pressure within the valve chamber would act upon the seal carrier member 106 forcing it downstream to the left as illustrated in FIG. 3. Fluid pressure from the valve body will also act simultaneously upon areas A1 and A2 of the seat assembly thereby producing a resultant force, by virtue of fluid pressure acting against a greater area at the rear portion of the seat assembly than at the face portion thereof, which biases the downstream seat assembly into tight sealing engagement with the plug member.

Assuming that the seat assembly of FIG. 2 is serving an upstream sealing function and assuming that the spherical plug member 34 is rotated 90° to its closed position, fluid pressure within the flow passage 15 would be greater than the fluid pressure within the valve chamber 14. Under these circumstances, fluid pressure within the flow passage 15 will force the bearing and seal carrier member 106 to the right in the manner illustrated, thereby allowing fluid pressure to be exerted upon a rear portion of the seat assembly as defined by area A4 shown in FIG. 3. Simultaneously fluid pressure within the flow passage 15 will act upon the front portion of the seat assembly through an area defined by diameter A3. Since area A4 is greater than area A3, the fluid pressure acting upon a greater area at the rear portion of the seat assembly than at the front portion thereof will develop a resultant force tending to bias the seat assembly toward the plug member 34.

It is readily apparent therefore that one of the seat assemblies 74 and 76 serves as an upstream seat while the other serves as a downstream seat upon the application of fluid pressure to the valve in any desired direction. In the event the direction of fluid is reversed, the function of the seat assemblies will also reverse. The upstream seat will then assume the function of the downstream seat while the downstream seat reverses its operation and assumes the function of an upstream seat. It is therefore clearly apparent that regardless of direction of fluid flow and regardless of any change in direction of the fluid flow, both of the seat assemblies will be pressure actuated into fluid-tight engagement with the working surface of the spherical plug. In the event that either the upstream or downstream seat assemblies becomes damaged or worn to the extent that the sealing ability thereof is lost or impaired, the other of the seat assemblies will continue to maintain a fluid-tight seal to prevent leakage of the valve during operation thereof.

The annular sealing members 112, 114, 120 and 122 illustrated particularly in FIG. 4, in addition to maintaining a fluid-tight seal between the seal carrier member 106 and the adjacent wall of the seat assembly or seat recess, also serve to confine the lubricant material within the lubrication system of the valve body and seat assembly. The sealing members prevent extrusion of lubricant material either into the seat recess or into the valve chamber of the valve. With reference to FIGS. 2 and 3, it is apparent that regardless of the position of the seal carrier 106 within the chamber 104, communication between the annular groove 126 in the seat ring 78 and the lubricant passage 92 is maintained at all times, thereby allowing lubricant material to be introduced at any time. The lubricant material also serves to provide proper lubricant for the bearing surfaces of the seal carrier and seat ring and to enhance the sealing ability of the sealing rings carried by the seal carrier 106, thereby tending to extend the ordinary sealing life of the sealing rings. The valve lubricant therefore serves multiple functions of enhancing the sealing ability of the space sealing member 84 and providing for bearing lubrication as well as enhancing the sealing ability of the O-ring back sealing members retained by the seal carrier.

Figure 5:
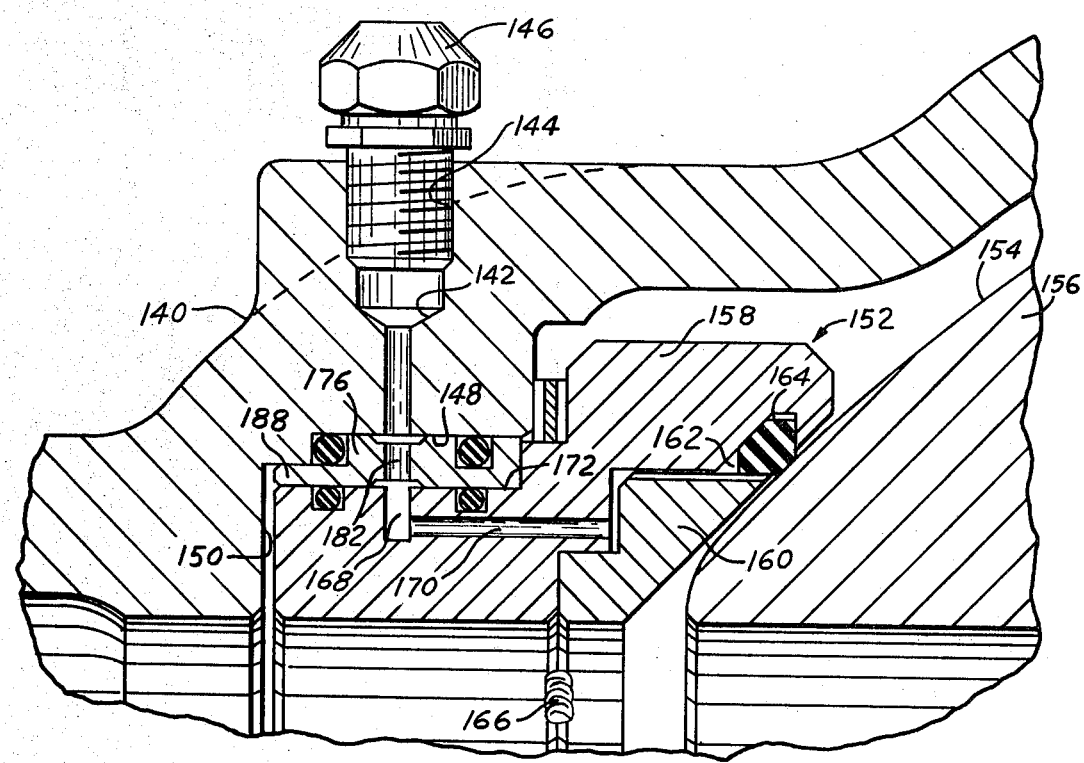
FIG. 5 is a fragmentary sectional view of a spherical plug valve illustrating a modified embodiment of this invention.
Figure 6:
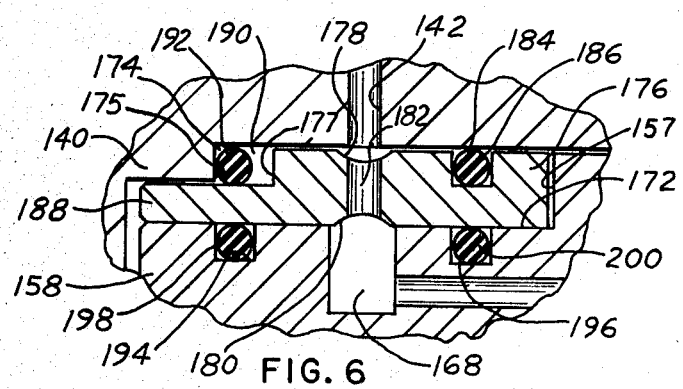
FIG. 6 is a fragmentary sectional view of the valve of FIG. 5 illustrating the bearing and seal structure of FIG. 5 in detail.

With reference now to FIGS. 5 and 6 which illustrate a modified embodiment of this invention, a valve body 140 is provided which is quite similar in construction to the valve body 12 illustrated in FIG. 1. For purpose of simplicity and clarity only a portion of the valve body 140 is illustrated in FIG. 5. The valve body 140 is provided with a lubricant passage 142, the outer extremity of which is threaded at 144 to receive the threaded portion of a lubricant fitting 146. The inner extremity of the lubricant passage 142 terminates at a cylindrical surface 148 which defines the outer peripheral wall of a seat recess 150. The valve body 140 is provided with opposed seat recesses such as illustrated in FIG. 1, but only one of the seat recesses is illustrated for purpose of simplicity. Each seat recess retains an annular seat assembly illustrated generally at 152 which is operative to maintain sealing engagement with the working surface 154 of a spherical rotatable plug member 156. Each of the seat assemblies comprises a seat ring 158 and a retainer ring 160 which interfit to define an annular groove 162 of generally triangular cross section. An annular face-sealing member 164 is retained within the groove 162 and has an annular sealing portion thereof extending through a restricted opening of the groove 162 and maintaining sealing engagement with the working surface 154. To prevent the retainer 160 from becoming displaced from the seat ring 158 the retainer ring may be spot welded to the seat ring such as illustrated at 166 in FIG. 5 or the retainer may be retained by a press fit thereof with the seat ring.

The seat ring 158 is provided with an annular groove 168 which is in communication with a series of passages 170 which communicate lubricant material to an annular space defined between the retainer ring 160 and the seat ring. Lubricant material is communicated to the area of sealing contact between the sealing member 164 and the sealing surface 154 by a series of small grooves or passages which are defined between the retainer 160 and an inner surface of the seat ring 158 in the same manner as discussed above regarding FIGS. 2 and 3.

The seat ring 158 is provided with a generally cylindrical surface 172 which is disposed in substantially concentric spaced relation with the cylindrical surface 148 of the seat recess 150, thereby defining an annular chamber 174. An annular back seal carrier and bearing member 176 is movable disposed within the chamber 174 and cooperates with annular sealing members to define a positive fluid-tight seal between the valve body 140 and the seat ring 158. The seal carrier member 176 is provided with interior and exterior lubricant channels 178 and 180 which are communicated by a series of apertures 182 formed about the periphery of the carrier member. The seal carrier member 176 is provided with an annular groove 184 which receives an annular sealing member 186 for the maintenance of a seal between the carrier member and the valve body 140. A reduced diameter portion 188 is defined on the carrier member 176 and cooperates with a stepped shoulder 175 of the seat recess to define an annular back-sealing chamber 190 in which is disposed an annular sealing member 192 to establish a further seal between the carrier member and the valve body. Annular grooves 194 and 196 are formed in the seat ring 158 on opposite sides of the annular lubricant groove 168 and retain sealing members 198 and 200 for the establishment of seals between the carrier member 176 and the seat ring 158.

The carrier and bearing member 176 is movable axially with respect to the seat ring 158 and the valve body 140 in the same manner as in the carrier ring 106 shown in FIGS. 2 and 3. The seat assembly 152 likewise is pressure actuatable by line pressure or body pressure depending upon the direction of fluid flow to maintain both upstream and downstream seals with the working surface 154 of the plug member 156 in the same manner as discussed above according to FIGS. 2 and 3. In addition the structure illustrated in FIGS. 5 and 6 provides for pressure actuation of the seat assembly by the lubricant material which is introduced into the lubricant passage 142 between the O-ring sealing members 186 and 192. The lubricant reacts against the O-rings forcing the O-ring 192 into engagement with the stepped shoulder 175 of the seat recess walls. The lubricant material within the chamber 190 will then react against the annular shoulder 177 defined by the reduced diameter portion 188 of the carrier member, thereby developing a force which urges the carrier member in a direction toward the plug member 156. The bearing and seal carrier member in turn will bear against the adjacent annular shoulder 157 of the seat ring 158, thereby forcing the seat ring and other components of the seat assembly 152 in a direction toward the spherical plug member 156. The carrier member 176 and the seat assembly therefore are pressure actuatable not only by the fluid controlled by the valve, but also by lubricant pressure thereby providing for both internal and external control of the seat assemblies.

It is evident from the foregoing that I have provided a unique valve construction having lubricated valve seat assemblies which effectively achieves simultaneous upstream and downstream seals with a valve member regardless of the direction of fluid flow through the valve. This is accomplished by bearing and back seal carrier members which are interposed between each seat assembly and the valve body and which cooperate with the seat assemblies in such manner as to create a force differential on each of the seat assemblies biasing the seat assemblies into fluid-tight engagement with the valve member. This is referred to in the industry as pressure actuation of the seat assemblies to achieve simultaneous upstream and downstream seals with the valve element.

In addition to the provision of simultaneous upstream and downstream seals the valve construction of my invention also effectively provides for even distribution of lubricant material about the working surface of the valve member immediately adjacent the perimeter of sealing contact between the seat assembly and the working surface. Thus lubrication of the face-sealing structure of the seat assemblies and of the working surface is accomplished to limit wear and thereby extend the working life of the face seals. Additionally, the deposit of lubricant material immediately adjacent the perimeter of sealing contact effectively enhances the sealing ability of the face-sealing elements thereby promoting full-range sealing aspects of the valve and also providing for sealing in the event the face-sealing members should become worn or damaged. The lubricant material within the lubrication system also enhances the sealing ability of the back-sealing members in addition to providing lubrication therefor. My invention further contemplates pressure actuation of the seat assemblies by the lubricant material thereby lending a selectively controllable aspect to the valve construction not only for proper valve functioning, but also for the purpose of testing the valve while the same is in operation. Through the unique design of the back-sealing structure of the instant invention and its relationship with the face-sealing structure of the seat assembly, the invention effectively provides the attributes of a lubricated valve seat structure and incorporates the same into a double-acting seat structure for valves which achieves simultaneous upstream and downstream seals. In view of the above, it is clearly apparent that all of the various objects of this invention are achieved and that other advantageous results are attained through utilization of the particular valve constructions set forth hereinabove.

As various changes may be made in the above construction without departing from the spirit or the scope of my invention, it is intended that all matter contained in the above description or shown in the accompanying drawings shall be interpreted as illustrative and not in a limiting sense.

I claim:

1. A lubricated valve comprising a valve body defining a valve chamber, said valve body having inlet and outlet fluid passages disposed in fluid communication with said valve chamber, a valve member disposed within said valve chamber and being movable between open and closed positions relative to said fluid passages to control the flow of fluid through the valve, means for moving said valve member, generally cylindrical seat recess means of substantial axial length formed in said valve body about at least one of said fluid passages, seat means defining cylindrical support surfaces of substantial axial length movably located in said seat recess means and establishing a perimeter of sealing contact with said valve member, said seat means having at least one lubricant passage defined therein for conducting lubricant material to a position on said valve member adjacent said perimeter of sealing contact, said seat means cooperating with said seat recess means to define an annular back seal chamber having a generally cylindrical inner periphery disposed radially inwardly of said perimeter of sealing contact and having a generally cylindrical outer periphery disposed radially outwardly of said perimeter of sealing contact, means for introducing lubricant into said back seal chamber, an annular back-sealing member of substantial axial length having generally cylindrical inner and outer surfaces disposed within said back seal chamber and maintaining a fluid-tight seal between said seat means and said valve body, said back-sealing member having bearing engagement with said cylindrical seat recess and said cylindrical outer periphery of said seat means to movably support said seat means for positive alinement with said valve member, said back-sealing means having at least one lubricant passage means between the inner and outer peripheries thereof for conducting lubricant material from said back seal chamber to said lubricant passage in said seat means.

2. A lubricated valve as set forth in claim 1, said back-sealing means establishing seals between the seat means and valve body on either side of said lubricant introducing means and said lubricant passages whereby lubricant is confined between said seals and is prevented from being extruded into said valve body or said fluid passages.

3. A lubricated valve as set forth in claim 1, said back seal chamber being greater in axial length than the radial width thereof, said back seal means being smaller in axial length than the axial length of said back seal chamber and being axially movable within said back seal chamber by fluid pressure differential between the valve chamber and fluid passages whereby fluid pressure from said fluid passages is communicated radially outwardly of said perimeter of sealing contact and fluid pressure from said valve chamber is communicated radially inwardly of said perimeter of sealing contact causing each of said seat means to be biased toward said valve member by fluid pressure.

4. A lubricated valve as set forth in claim 3, said back seal member having a pair of seal grooves formed in the inner and outer peripheries thereof, resilient sealing members disposed in each of said seal grooves and establishing a seal between said bearing member and the adjacent inner and outer peripheral walls of said back seal chamber and seat means, at least one lubricant port formed in said bearing member between said seal grooves and cooperating with said resilient sealing members to define said lubricant passage means.

5. A lubricated valve as set forth in claim 3, said bearing member and said seat means being urged toward said valve member by lubricant pressure upon introduction of said lubricant material into said back seal chamber.

6. A lubricated valve comprising a valve body defining a valve chamber and having fluid flow passages disposed in fluid communication with said valve chamber, a valve member located within said valve chamber and being movable between open and closed positions to control the flow of fluid through the valve, means for imparting movement to the valve member, opposed generally cylindrical seat recesses of substantial axial length formed within said valve body about said fluid flow passages, seat assembly means movably received within said seat recesses and establishing fluid-tight seals with said valve member and with said valve body, each of said seat assemblies cooperating with the associated seat recess to define an annular back seal chamber therebetween having inner and outer generally cylindrical surfaces of substantial axial length, a bearing member of substantial axial length disposed within said annular chamber and having bearing contact with said cylindrical outer peripheral surface of said seat recess and with cylindrical surface on said seat assembly to movably support said seat assembly means, in positive alinement with said valve member, at least one lubricant port formed in said bearing member and communicating lubricant material from said valve body to said seat assembly, annular sealing members disposed on either side of said lubricant port both at the inner periphery and outer periphery of said bearing member to establish sealing engagement between said bearing member and valve body and between the bearing member and said seat assembly.

7. A lubricated valve as set forth in claim 6, said seat assembly cooperating with said seat recess to define an annular chamber therebetween, said bearing member movably disposed within said annular chamber, means establishing annular seals between said bearing member and said valve body and between said bearing member and said seat assembly means.

8. A lubricated valve as set forth in claim 7, said bearing member and said seat assembly means being movable toward said valve member by said lubricant material to insure positive sealing engagement between said seat assembly and said valve member.

9. A lubricated valve as set forth in claim 7, said means establishing annular seals comprising annular chambers defined between said bearing member and said valve body and between said bearing member and said seat assembly, resilient sealing members disposed within said annular chambers and establishing seals with said valve body at the outer periphery of said bearing member and establishing seals with said seat assembly at the inner periphery of said bearing member.

10. A lubricated valve as set forth in claim 9, said bearing member having annular seal grooves formed therein, said resilient sealing members being carried within said grooves.

11. A lubricated valve as set forth in claim 9, said bearing member valve body and seat ring interfitting to define a plurality of annular seal chambers, said sealing members being contained within said annular seal chambers.